No. 662,188. Patented Nov. 20, 1900.
J. CORNÉLIS.
SCREW CUTTING ATTACHMENT FOR LATHES.
(Application filed Jan. 15, 1900.)
(No Model.)
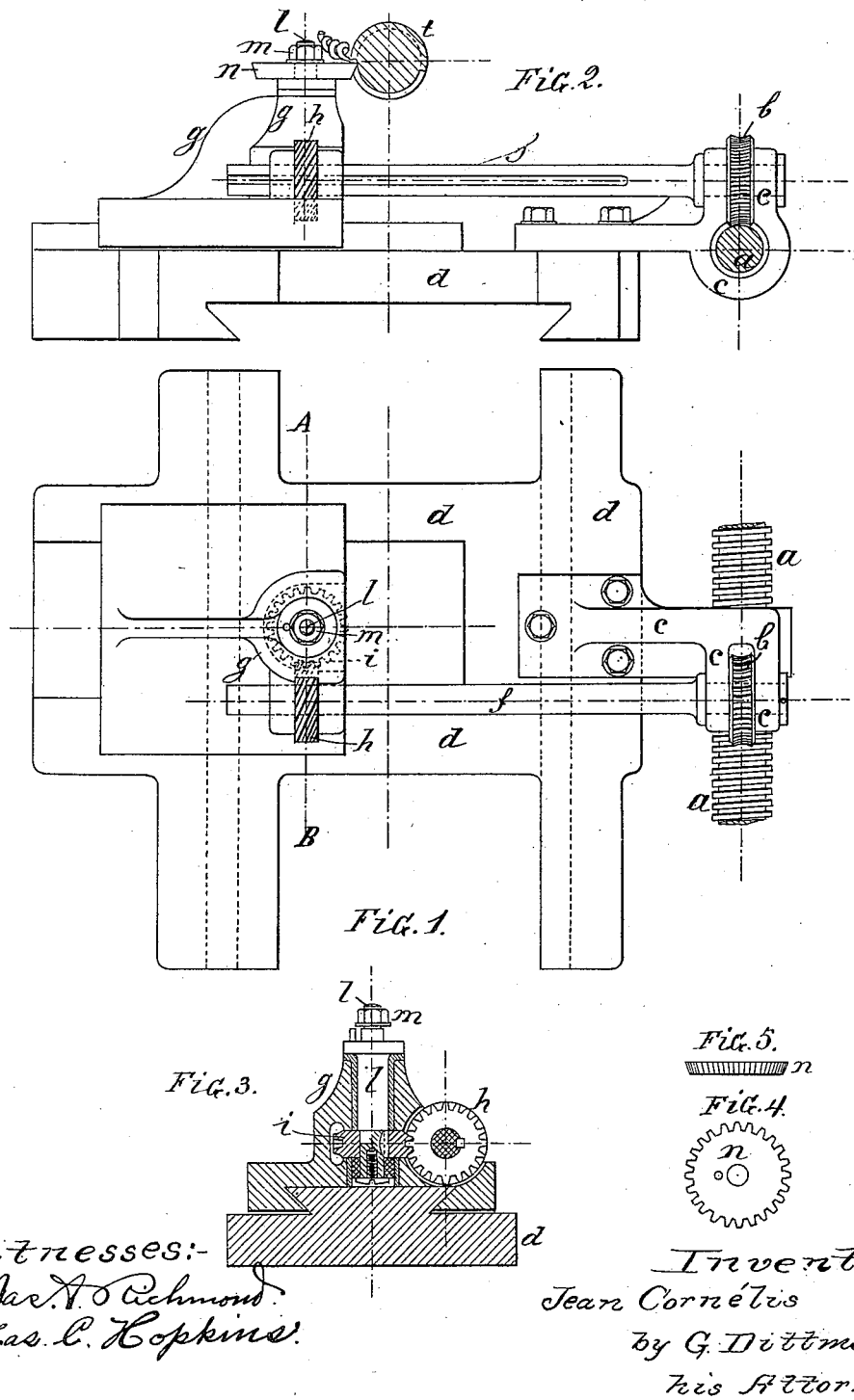
Witnesses:-
Jas. A. Richmond
Jas. C. Hopkins
Inventor
Jean Cornélis
by G. Dittmar
his Attorney
THE NORRIS PETERS CO., PHOTO-LITHO., WASHINGTON, D. C.

UNITED STATES PATENT OFFICE.

JEAN CORNÉLIS, OF LIEGE, BELGIUM.

SCREW-CUTTING ATTACHMENT FOR LATHES.

SPECIFICATION forming part of Letters Patent No. 662,188, dated November 20, 1900.

Application filed January 15, 1900. Serial No. 1,486. (No model.)

*To all whom it may concern:*

Be it known that I, JEAN CORNÉLIS, a subject of the King of Belgium, residing at Liege, Belgium, have invented certain new and useful Improvements in Screw-Cutting Attachments for Lathes; and I do hereby declare the following to be a full, clear, and exact description of the invention, such as will enable others skilled in the art to which it appertains to make and use the same.

The object of the present invention is an apparatus or attachment for screw-cutting capable of being fitted to any lathe and of finishing at one operation any screw-thread, whatever its form, depth, and pitch may be, completely and automatically.

In the annexed drawings only the saddle and tool-rest, together with an endless screw intended to work the tool, are shown. This endless screw is preferably set in motion by gearing controlled by the lathe. This gearing as well as the endless screw to move the saddle forward and to move the tool-rest support have no especial features and are not shown in the drawings.

Figure 1 is a plan view, Fig. 2 a lateral view, and Fig. 3 a section from A to B, Fig. 1, of the saddle with the tool-rest. In Figs. 1 and 3 the tool is removed to facilitate the comprehension of the drawings. Fig. 4 is a plan, and Fig. 5 a lateral view, of a circular cutting-tool. Of course this varies according to the shape of the thread to be cut.

On one of the longitudinal sides of the lathe and parallel to it there is an endless screw $a$, having its bearings in supports which are part of the structure and controlled by gearing actuated by the mechanism of the lathe. A worm-wheel $b$ engages this endless screw $a$ and transmits its movement to the tool. This wheel $b$ has its bearings in an arm $c$, affixed to the saddle $d$, which arm, surrounding the screw $a$, serves as a guide for it, Fig. 2. The worm-wheel $b$ is keyed to a shaft $f$, which at its other end is supported by the tool-rest $g$ and carries the wheel $h$, which has tangential teeth and is adjustable only longitudinally along this shaft $f$. This wheel $h$ engages a like toothed wheel $i$, keyed on the shaft $l$, the upper extremity of which carries either the rotating cutter or tool $n$ (shown in Figs. 4 and 5) or any other suitable tool. The tool $n$ is retained on the shaft $l$ by a nut $m$ or other means.

The work $t$ to be screw-cut being fixed in the lathe at a suitable height, the mechanism of the lathe is set in motion. The endless screw $a$ turns and communicates its motion to the wheel $b$, and thence through the shaft $f$, the wheels $h$ $i$, and the shaft $l$ to the tool $n$. The tool-rest $g$ is moved forward in the usual way until the tool comes into contact with the work to be screw-cut, and after the forward motion has been given to the saddle $g$ in the usual way the lathe is left to itself and a screw-thread of the required depth is formed at one operation. The forward motion of the tool-rest $g$ has no connection with the screw-thread or its depth.

The tool, which is of disk shape, has on its periphery teeth suitable for cutting or shaping the screw-thread required.

Owing to the rotation of the tool and the forward movement of the saddle the teeth of the former get to work successively and remove each a small portion from the object to be screw-cut.

By means of this lathe attachment any kind of screw-thread may be cut. It is only a question of changing the tool.

Having now particularly described and ascertained the nature of my said invention and in what manner the same is to be performed, I declare that what I claim is—

In a screw-cutting attachment for lathes, the combination with the tool-rest $g$ and the saddle $d$, movable longitudinally on the ways of the lathe, of the arm $c$ secured to the saddle, the screw $a$ passing through arm $c$ parallel with the work, the horizontal shaft $f$ journaled in the arm $c$ and in the tool-rest at right angles to the screw $a$, the worm $b$ on shaft $f$ engaging with the threads of screw $a$ and driven thereby, the vertical shaft $l$ journaled in the tool-rest, gearing whereby shaft $l$ is driven by shaft $f$ and the rotary tool $n$ carried by shaft $l$, substantially as described.

In testimony whereof I affix my signature in presence of two witnesses.

JEAN CORNÉLIS.

Witnesses:
    MARCEL REMY,
    FRANÇOIS ABSIF.